(12) United States Patent
Hughes et al.

(10) Patent No.: US 9,720,088 B2
(45) Date of Patent: Aug. 1, 2017

(54) MEASUREMENT DEVICE, SYSTEM AND METHOD

(71) Applicant: The Secretary of State for Business, Innovation & Skills, London (GB)

(72) Inventors: Edward Benjamin Hughes, London (GB); Matthew Stuard Warden, London (GB)

(73) Assignee: THE SECRETARY OF STATE FOR BUSINESS, INNOVATION & SKILLS, London (GB)

(*) Notice: Subject to any disclaimer, the term of this patent is extended or adjusted under 35 U.S.C. 154(b) by 0 days.

(21) Appl. No.: 14/388,198

(22) PCT Filed: Mar. 28, 2013

(86) PCT No.: PCT/GB2013/050837
§ 371 (c)(1),
(2) Date: Sep. 25, 2014

(87) PCT Pub. No.: WO2013/144648
PCT Pub. Date: Oct. 3, 2013

(65) Prior Publication Data
US 2015/0055138 A1    Feb. 26, 2015

(30) Foreign Application Priority Data
Mar. 29, 2012 (GB) .................................. 1205563.8
Jan. 10, 2013 (GB) .................................. 1300433.8

(51) Int. Cl.
*G01S 17/66* (2006.01)
*G01S 17/32* (2006.01)
(Continued)

(52) U.S. Cl.
CPC .......... *G01S 17/66* (2013.01); *G01B 9/02049* (2013.01); *G01S 7/4817* (2013.01);
(Continued)

(58) Field of Classification Search
CPC ....................................................... G01S 17/66
(Continued)

(56) References Cited

U.S. PATENT DOCUMENTS 3,559,937 A    2/1971    Paine et al.
3,665,283 A    5/1972    Le Gall
(Continued)

FOREIGN PATENT DOCUMENTS

CA    2143838 A1    3/1994
CN    201900513 U    7/2011
(Continued)

OTHER PUBLICATIONS

International Search Report in co-pending related PCT Application PCT/GB2013/050838, mailed Jun. 10, 2013.
(Continued)

*Primary Examiner* — Tarifur Chowdhury
*Assistant Examiner* — Omar Nixon
(74) *Attorney, Agent, or Firm* — Thomas | Horstemeyer, LLP

(57) ABSTRACT

A measurement device (120) includes a light director and a spatial light modulator (130). The light director is disposed to direct light to the spatial light modulator (130) and the spatial light modulator (130) is disposed to receive light from the light director and to modulate it to form an intensity pattern. An optical element is disposed to receive light which formed the intensity pattern and is arranged to magnify the intensity pattern into a measurement space. A detector (142) is disposed to detect light reflected from the measurement space.

20 Claims, 1 Drawing Sheet

(51) Int. Cl.
G01S 7/481 (2006.01)
G01B 9/02 (2006.01)
G01S 17/06 (2006.01)

(52) U.S. Cl.
CPC ............ *G01S 7/4818* (2013.01); *G01S 17/06* (2013.01); *G01S 17/325* (2013.01)

(58) Field of Classification Search
USPC ........................................................ 356/482
See application file for complete search history.

(56) References Cited

U.S. PATENT DOCUMENTS

| | | | |
|---|---|---|---|
| 3,809,477 | A | 5/1974 | Russell |
| 4,576,481 | A | 3/1986 | Hansen |
| 4,714,339 | A | 12/1987 | Lau et al. |
| 5,253,033 | A | 10/1993 | Lipchak et al. |
| 5,294,980 | A | 3/1994 | Matsugu |
| 5,779,187 | A | 7/1998 | Dulat et al. |
| 6,147,748 | A | 11/2000 | Hughes |
| 7,139,446 | B2 | 11/2006 | Slotwinski |
| 7,268,348 | B2 | 9/2007 | Binning et al. |
| 2002/0021139 | A1 | 2/2002 | Jackson |
| 2003/0174401 | A1 | 9/2003 | Brunner |
| 2003/0234936 | A1 | 12/2003 | Marron |
| 2006/0066836 | A1 | 3/2006 | Bridges |
| 2006/0227317 | A1 | 10/2006 | Henderson et al. |
| 2007/0015969 | A1 | 1/2007 | Feldman |
| 2007/0194225 | A1 | 8/2007 | Zorn |
| 2008/0024793 | A1 | 1/2008 | Gladnick |
| 2008/0154538 | A1 | 6/2008 | Stathis |
| 2008/0297865 | A1* | 12/2008 | Hara .................... G11B 7/0065 359/12 |
| 2009/0086179 | A1* | 4/2009 | Hult .......................... G01J 1/04 355/53 |
| 2009/0118622 | A1* | 5/2009 | Durkin ................. A61B 5/0073 600/473 |
| 2010/0253762 | A1* | 10/2010 | Cheong ................... G01B 9/021 348/31 |
| 2010/0258708 | A1 | 10/2010 | Meyers |
| 2010/0322553 | A1* | 12/2010 | Prucnal ..................... G02F 1/31 385/18 |
| 2011/0047661 | A1 | 2/2011 | Leach |
| 2012/0002256 | A1* | 1/2012 | Lacoste .............. G02B 27/0081 359/9 |
| 2015/0085297 | A1 | 3/2015 | Hughes et al. |

FOREIGN PATENT DOCUMENTS

| | | |
|---|---|---|
| DE | 19611595 A1 | 9/1997 |
| DE | 10118668 A1 | 10/2002 |
| EP | 1760422 A1 | 3/2007 |
| EP | 2051101 A1 | 12/2011 |
| GB | 1010894 A | 11/1965 |
| GB | 2 285 550 A | 7/1995 |
| GB | 2285550 A | 7/1995 |
| GB | 2427912 A | 1/2007 |
| JP | 2002289243 A | 10/2002 |
| WO | 94/05970 A1 | 3/1994 |
| WO | 01/47427 A2 | 7/2001 |
| WO | 02068904 A1 | 9/2002 |
| WO | 2008/067349 A2 | 6/2008 |
| WO | 2009063217 A1 | 5/2009 |
| WO | 2011/029811 A1 | 3/2011 |
| WO | 2012022955 A1 | 2/2012 |
| WO | 2013/144649 A1 | 10/2013 |

OTHER PUBLICATIONS

Combined Search and Examination Report in co-pending, related GB 1300433.8, mailed May 1, 2013.
Search Report in co-pending, related GB No. 1205563.8, mailed Jul. 17, 2012.
Wikipedia Article on Retro-Reflectors: Snapshot from Mar. 20, 2012. See particularly the section with the title "Cat's Eye". (Ret4rieved Jul. 13, 2012). http://wikipedia.org/w/index.php?title=Retrofeflector&oldid=482958141.
Gerchberg, R., & Saxton, W. (1971). Phase determination for image and diffraction plane pictures in the electron microscope. Optik. Retrieved from http://scholar.google.co.uklscholar?hl=en&q=gerchberg+saxton&btnG=&as_sdt=125 %2C5&as_sdtp=#7.
Takatsuji, T., Goto, M., Osawa, S., Yin, R., & Kurosawa, T. (1999). Wholeviewing-angle cat's-eye retroreflector as a target of laser trackers. Measurement Science and Technology, 1 0(7), N87-N90. doi:1 0.1088/0957-0233/10/7/403.
Schneider, R., ThCirmel, P., & Stockmann, M. (2001). Distance 30 measurement of moving objects by frequency modulated laser radar. Optical Engineering, 40{1 ), 33. doi:1 0.1117/1.1332772.
Website located at: http://www.nikonmetrology.com/en_EU/Products/Large-Volume-Applications/iGPS/iGPS, downloaded on Jun. 3, 2015.
Website located at: http://www.metronor.com/products/duo/, downloaded on Jun. 3, 2015.
Website located at: http://aicon3d.com/products/moveinspect-technology.html, downloaded on Jun. 3, 2015.
Website located at: http://www.geodetic.com/products/systems/v-stars-d.aspx, downloaded on Jun. 3, 2015.
Chinese Office Action Mailed Jan. 7, 2016 in related, copending Chinese Application No. 201380025699.0.
Zhuang, et al., "Modeling gimbal Azis Misalignments and Mirror Center Offset in a Single-Beam Laser Tracking Measurement System", the International Journal of robotics Research, vol. 14, No. 3, Jun. 1995, pp. 211-224.
Reichold, et al., "The Licas-RTRS—A Survey System for the ILC", Proceedings of EPAC 2006, Edinburgh, Scotland, pp. 520-522.
Wang, et al., "Progress and analysis of the liquid crystal phased array technology in ladar", IEEE, 2010, pp. 273-276.
Xun, et al., "System for demonstrating arbitrary multi-spot beam steering from spatial light modulators", Optics Express, vol. 12, No. 2, Jan. 26, 2004, pp. 260-268.
Hassebrook, et al., "Dynamic Spot Pattern Projection to Detect and Track Object Motion", Optical Pattern Recognition XII, Proceedings of SPIE, vol. 4387, 2001, pp. 232-237.
Satyan, et al., "Chirp Multiplication by Four Wave Mixing for Wideband Swept-Frequency Sources for High Resolution Imaging", Journal of Lightwave Technology, vol. 28, No. 14, Jul. 15, 2010, pp. 2077-2083.
Stoyanov, et al., "Modelling and Prototyping the Conceptual Design of 3D CMM Micro-probe", 2nd Electronics Systemintegration Technology Conference, Greenwich, UK, 2009, pp. 193-198.
Schneider, et al., "Distance measurement of moving objects by frequency modulated laser radar", Society of Photo-Optical Instrumentation Engineers, Opt. Eng. 40(1), Jan. 2001, pp. 33-37.
Coe, et al., "Frequency scanning interferometry in ATLAS: remote, multiple, simultaneous and precise distance measurements in a hostile environment", Institute of Physics Publishing, Measurement Science and Technology, 15, 2004, pp. 2175-2187.
Satyan, "Optoelectronic Control of the Phase and Frequency of Semiconductor Lasers", California Institute of Technology, Pasadena, California, 2011, 214 pages.
Schneider, Carl-Thomas, "Lasertracer—A New Type of Self Tracking Laser Interferometer", IWAA2004, CERN, Geneva, Oct. 4-7, 2004.
Hughes, Ben, "Multilateration: Principles and Case Study", National Physical Laboratory, LVMC, Nov. 6, 2007.
Oakley, John P., "Whole-Angle Spherical Retro-Reflector Using Concentric Layers of Homogenous Optical Media", Applied Optics, vol. 46, No. 7, Mar. 1, 2007.
Reichold, Dr. A., "Frequency Scanning Interferometry for Laser Trackers and Laser Tracers", located at website: http://gow.epsrc.ac.uk/NGBOViewGrant.aspx?GrantRef=EP/h018220/1, Jan. 2010.
Takatsuji, Toshiyuki, "Laser Tracking System for Coordinate Measurement", www.cenam.mx/ammdeventos/evento2003/LaserTracker.pdf, 2003.
Dale, John, "A Study of Interferometric Distance Measurement Systems on a Prototype Rapid Tunnel Reference Surveyor and the

(56) References Cited

OTHER PUBLICATIONS

Effects of Reference Network Errors at the International Linear Collider", Thesis submitted in partial fulfilment of degree of Doctor Philosophy at the University of Oxford, 2009.
Green, John R., "7. Development of a Prototype Frequency Scanning Interferometric Absolute Distance Measurement System for the Survey & Alignment of the International Linear Collider", Thesis submitted in partial fulfilment of degree of Doctor Philosophy at the University of Oxford, 2007.
Warden, Matthew Stuard, "Absolute Distnace Metrology Using Frequency Swept Lasers", Thesis submitted in partial fulfilment of degree of Doctor Philosophy at the University of Oxford, Aug. 2012.
International Search Report in co-pending related PCT Application PCT/GB2013/050838, mailed Jun. 28, 2013.

\* cited by examiner

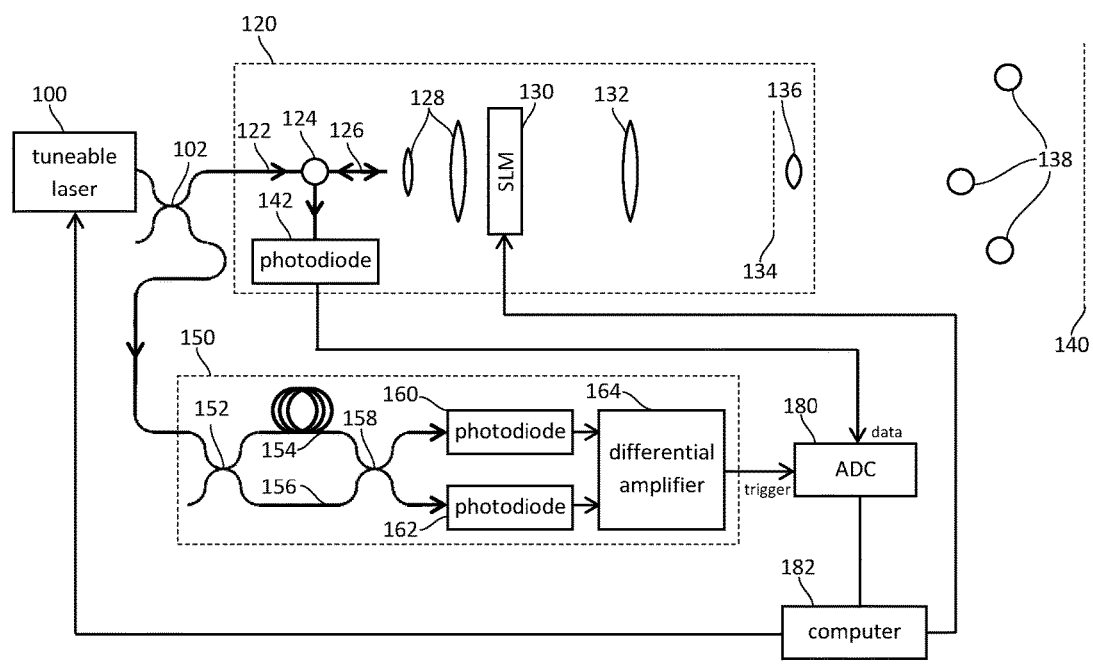

MEASUREMENT DEVICE, SYSTEM AND METHOD

CROSS-REFERENCE TO RELATED APPLICATION

This application is the 35 U.S.C. §371 national stage of, and claims priority to and the benefit of, PCT application PCT/GB2013/050837, filed Mar. 28, 2013, which claims priority to and the benefit of GB Application No. 1205563.8, filed on 29 Mar. 2012, and claims priority to and the benefit of GB Application No. 1300433.8, filed on 10 Jan. 2013, herein incorporated by reference in their entireties.

The present invention relates to a measurement device, system and method in particular for measuring distance.

Various methods exist for measuring an object. Known methods include, for example, laser tracking.

A laser tracker uses a combination of angle and range based sensors. It emits a narrow collimated laser beam to a special retro-reflective target such as a spherically mounted retro-reflector (SMR). The SMR reflects the beam back to the instrument along the same path as the emitted beam. A sensor in the laser tracker detects movement of the SMR and a mechanism steers the laser beam to follow the SMR at all times. Angle encoders on the beam steering mechanism measure vertical and horizontal angles from the laser tracker to the SMR and a laser based range measurement system measures distance to the SMR. This combination of two angles and a range give the three-dimensional coordinates of the SMR in spherical polar form.

A disadvantage of this technique is that each laser tracker can only monitor a single reflector at any one time, meaning that in the case particularly of a large construction where many points of reference are required, the tracker must be steered to each reflector in sequence, a process that can be time consuming and labour intensive, and requires all targets to be stationary whilst this is done.

Another disadvantage of the above technique is due to the requirement for part of the tracker to move in order to detect SMRs in different locations: Imperfections in the mechanics controlling this motion create errors in the measured coordinates.

Another disadvantage is due to the use of angle based measurements. Uncertainty in SMR position in a direction perpendicular to a line between tracker and target is proportional to the product of distance between tracker and target and the uncertainty in the measurement of angle to the target. The uncertainty in angle measurement is a combination of the angle sensor uncertainty, bending of the laser beam caused by thermal gradients in the air, and random disturbances to the laser beam direction caused by air turbulence. This potentially creates a large uncertainty in SMR position when the SMR is located at a large distance from the tracker. Angle based coordinate measurement systems are inherently less accurate that range based systems when deployed in typical industrial environments.

The present invention seeks to provide an improved measurement device, system and method.

According to an aspect of the invention, there is provided a measurement device, including:
a light director and a spatial light modulator, wherein the light director is disposed to direct light to the spatial light modulator and the spatial light modulator is disposed to receive light from the light director and to modulate it to form an intensity pattern;
an optical element disposed to receive light which formed the intensity pattern and arranged to magnify the intensity pattern into a measurement space; and
a detector disposed to detect light reflected from the measurement space.

Preferred embodiments of the invention use a spatial light modulator to split a measurement beam into multiple components, which are directed towards targets. This greatly increases the reflected signal intensity when compared to diverging a single beam over a wide area (which is a highly inefficient use of light). Therefore a usable signal strength is received at much larger target ranges. This is better than increasing the output power of a single beam which would make the system unsafe.

Preferably, the optical element is arranged to magnify the intensity pattern into the measurement space in a divergent manner. Many prior art devices aim for collimated beams directed towards a single target to avoid wastage of light. However, in preferred embodiments of the invention, because a spatial light modulator is able to split a measurement beam into multiple components thus illuminating multiple targets simultaneously, magnifying the intensity pattern in a divergent manner does not lose a significant amount of light as the divergence of the components of the measurement beam can be kept small and directed specifically towards targets of interest.

Preferably, the spatial light modulator is programmable whereby the intensity pattern is controllable. This can mean that the device can be reconfigured for use in different scenarios, for example with different objects to be measured. It can also mean that the device can be operable to compensate for movement within the measurement space, for example to cause beams of light to follow one or more reflective targets as they move within the measurement space. This can mean that, despite only illuminating a small amount of the measurement space, the measurement device can continuously illuminate and take measurements of a moving target or targets within the measurement space.

Preferably, the device includes a control unit for controlling the spatial light modulator, the control unit being configured to control the spatial light modulator to form the intensity pattern, when illuminated with light from the light director, to produce at least one light beam, and preferably a plurality of beams, in the measurement space. As mentioned above, each beam is preferably diverging.

The control unit is preferably operable to direct each beam at a reflective target in the measurement space, and the light director is preferably configured to direct retroreflected light from the measurement space to the detector. This can enable, for example, frequency scanning interferometry to be performed to allow the device to determine a distance from the device to one or more reflective targets.

According to another aspect of the invention, there is provided a measurement system, including:
at least one measurement device as described above;
at least one reflective target to be positioned in the measurement space and for reflecting light to the detector.

Preferably, each reflective target is a retroreflective target, meaning that the target can be surrounded by a plurality of measurement devices. Surrounding a target with a plurality of measurement devices means that a three dimensional coordinate of the target can be obtained, rather than purely a distance from a device to the target.

Preferably, a plurality of reflective targets is arranged on one or more objects to be measured. This can enable an accurate three dimensional measurement of various points of an object or objects to be taken, which can be of great assistance particularly in the assembly of complex products where accuracy and precision are essential.

According to another aspect of the invention, there is provided a method of measuring targets, including:

arranging a plurality of reflective targets in a measurement space;

directing light at a spatial light modulator;

operating the spatial light modulator to modulate the light to produce a plurality of light beams in the measurement space, there being at least one beam directed at each of the reflective targets; and detecting at a detector light reflected from each of the reflective targets and thereby determining a measurement associated with each reflective target.

Preferred embodiments of the invention provide a measurement device, system and method for measuring distance and the coordinates of multiple targets. simultaneously. The preferred embodiment provides the following advantages over other instruments:

Simultaneous measurement of multiple target positions, resulting in reduced overall measurement time and increased coverage (fewer line-of-sight problems).

High-accuracy coordinate measurements based on range data alone rather than inherently less accurate angle data.

Self-calibration; the coordinate frame is derived directly from the data rather than physically defined by the mechanics of the instrument.

Embodiments of the invention are described below, by way of example only, with reference to the accompanying drawing, in which FIG. 1 is a schematic diagram of a measurement system according to an embodiment of the invention.

With reference to FIG. 1, a measurement system includes a light source in the form of a tuneable laser 100. The tuneable laser 100 is a continuous wave external cavity diode laser with a mode-hop free tuning range from 1530 nm to 1560 nm. However, other frequency ranges can be utilised as appropriate.

The system also includes a control unit in this example in the form of a computer 182. The laser 100 is configured to accept an input from computer 182 that controls the wavelength tuning characteristics.

The output light of the laser 100 is coupled into a single mode polarisation maintaining fibre, and directed to a fibre splitter 102.

The fibre splitter 102 splits the light it receives into two portions. A first portion is directed along an optical fibre 122 to a measurement device 120 and a second portion is directed along an optical fibre to a clock box 150.

The measurement device 120 is configured to direct input light received through fibre 122 into a light director. The light director includes a light directing element in the form of a fibre circulator 124, and a light divider in the form of an optical fibre 126.

The measurement device 120 is configured to direct input light received through fibre 122 into a first port of the fibre circulator 124. The fibre circulator 124 is arranged to direct light entering the first port through a second port into fibre 126.

Fibre 126 includes a flat polished fibre end directed towards a spatial light modulator 130, described below. The flat polished fibre end reflects approximately 4% of the light reaching it back into the fibre 126. This reflected light forms the reference path of an interferometer as described below. The reflected light re-enters the second port of the fibre circulator 124. The fibre circulator is configured to direct light entering the second port to a third port which is coupled to a detector in the form of a detector photodiode 142.

Light exiting the second port of the fibre circulator which is not then reflected from the flat polished end of the optical fibre 126 exits fibre 126 and travels towards an optical element in the form of first and second lenses 128. The lenses 128 are configured to collimate and expand the light to a predetermined width beam. This beam is directed through the spatial light modulator (SLM) 130.

In this embodiment, the SLM 130 is an 800×600 pixel liquid crystal micro-display. However, the SLM can be any component capable of independently modulating the fraction of light transmitted through each pixel and/or the phase delay of light transmitted through each pixel. The SLM 130 is configured to accept an input from the computer 182 that programs the pattern of transmission levels to be displayed on the SLM.

After passing through the SLM 130 the light proceeds through an optical element in the form of a third lens 132 and reaches a plane 134. For the sake of clarity, note that there is not necessarily any physical object placed at plane 134; it is merely a plane of particular interest.

A distance between the SLM 130 and the third lens 132 is preferably equal to a focal length of the third lens 132. A distance between the third lens 132 and the plane 134 is also equal to the focal length of the lens 132. As is well known in the field of Fourier optics, such an arrangement of the SLM 130 and the third lens 132 will result in the optical field at plane 134 being equal to the Fourier transform of the modulated optical field that exits the SLM 130. This allows an arbitrary intensity pattern to be created at the plane 134, controlled by the pattern displayed upon the SLM 130.

The intensity pattern on plane 134 is imaged onto a distant plane 140 by an optical element in the form of a fourth lens 136. Note that FIG. 1 is not drawn to scale and that distant plane 140 will typically be significantly larger and further away than depicted. Preferably, the distant plane 140 is at a substantially infinite distance from the plane 134. The fourth lens 136 preferably has a high numerical aperture, preferably higher than 0.2, more preferably higher than 0.4 and most preferably higher than 0.6, so as to magnify the intensity pattern on plane 134 and project it over a wide angular range. Other numerical aperture values may be used depending upon the angular range required.

One or more retroreflective targets 138 are attached to one or more objects to be measured (not shown) in a measurement space beyond the fourth lens 136.

The SLM 130 is operable, under the control of the computer 182, to modulate light passing through it to produce an intensity pattern at plane 134 which comprises a set of bright spots. Each spot in the intensity pattern on plane 134 will create a beam of light between the fourth lens 136 and the image of the spot on plane 140. The angle at which the beam emerges is determined by the location of the spot on plane 134. The SLM 130 is operable so that the spot locations (and, therefore, beam angles) are produced such that each beam illuminates one of the retro-reflective targets 138 and each retroreflective target 138 is illuminated by a beam. As the fourth lens 136 magnifies the intensity pattern at plane 134 onto a large area at plane 140 the beams emerging from the fourth lens 136 will be slightly divergent. If two or more of reflective targets 138 are within a small angular range as viewed from the fourth lens 136, it may be that several of the illumination beams overlap, as the beam diameters may be larger than the target diameters.

The retro-reflective targets 138 are glass spheres with refractive index approximately equal to 2. As is well known, such a sphere acts as a cat's-eye retro-reflector (Takatsuji, Goto, Osawa, Yin, & Kurosawa, 1999), and therefore a portion of the light incident upon each target is reflected back towards the fourth lens 136. The reflective targets 138 do not need to be retroreflectors, as long as they direct light to a detector, preferably by reflecting light back towards the fourth lens 136. However, advantages can be obtained if the retroreflective targets 138 retroreflect light incident from any direction, meaning that each target can retroreflect light to a plurality of measurement devices at once.

Reflected light arriving at the fourth lens 136 returns through the elements of the measurement device 120 in reverse order to that described above until it reaches and enters fibre 126.

Light travelling back down fibre 126 towards fibre circulator 124 includes light coming from the 4% reflection off the fibre end, which is referred to herein as the reference path. The light travelling back down fibre 126 also includes light that has returned after being reflected from retro-reflective targets 138. The light that has returned after being reflected from retro-reflective targets includes a plurality of different paths. There is one distinct path for light returning from each retro-reflector. These are referred to herein as measurement paths. Light from the reference path interferes with light from each of the measurement paths, creating an interference signal. Note that light from any two measurement paths also interfere, but the measurement paths typically have a much lower intensity than the reference path, and therefore these interference signals have a negligible amplitude.

Light travelling back down fibre 126 enters the second port of the fibre circulator 124. As described above, light entering the second port of the fibre circulator 124 is routed via the third port to the detector photodiode 142, which converts the optical intensity received, including all the interference signals this contains into a voltage signal which is recorded by an analogue to digital converter (ADC) 180 which is coupled to the detector photodiode 142 and to the computer 182.

The clock box 150 receives as input light the second portion of light from the fibre splitter 102. The clock box 150 directs its input light through an unbalanced fibre Mach-Zehnder interferometer comprising a fibre splitter 152, the outputs of which are coupled by unequal lengths of fibre 154 and 156 to the inputs of a further fibre splitter 158. The outputs of this interferometer are the outputs of the further fibre splitter 158 which are connected to photodiodes 160 and 162. The difference of photocurrents of photodiodes 160 and 162 is amplified by a differential amplifier 164 and provided to the ADC 180 as a trigger signal for sample acquisition.

As explained above, the computer 182 controls the measurement process, including receiving digitised signals from ADC 180, controlling the tuning of the laser 100, and controlling the pattern projected upon the SLM 130.

The computer 182 is also operable to control the spatial light modulator to compensate for movement of any of the retroreflective targets 138. There are various ways in which this can be done. In some embodiments, a system can be provided in which a plurality of measurement devices 120 is provided around a measurement space. As described below, this can be used to calculate a three dimensional position of each target. As the computer 182 determines from the three dimensional position that a target is moving out of the beam of a measurement device 120, it can adjust the pattern projected upon the SLM 130 of the respective device 120 so that the beams emerging from the fourth lens 136 continue to illuminate each of the retroreflective targets 138.

A measurement using the system depicted in FIG. 1 is performed as follows.

First of all, the targets 138 are located. This can be done in various ways. For example, a camera system can be used to obtain an approximate location, or the measurement device can be operated to scan the measurement space and the points at which the detector detects reflection from the measurement space can be recorded as target locations.

The Gerchberg-Saxton algorithm (Gerchberg & Saxton, 1971) is used to design a pattern to display on the SLM 130 that will create bright intensity spots on plane 134 in the correct locations to create beams that illuminate each of the retro-reflective targets 138. The algorithm can be implemented in the computer 182. The computer 182 sends the resulting pattern to the SLM 130 and operates the SLM to display the pattern.

The computer 182 then sends commands to the tuneable laser 100 to initialise an approximately linear wavelength sweep of the laser from 1530 nm to 1560 nm, and simultaneously commands the ADC 180 to begin recording data.

A portion of the light output from the tuneable laser 100 enters the clock box 150 and passes through the unbalanced fibre Mach-Zehnder interferometer that comprises the fibre splitter 152, unequal lengths of fibre 154 and 156, and the further fibre splitter 158. The two outputs of this interferometer are sinusoidal signals that vary with laser optical frequency, going through one cycle every time the laser frequency increases by a predetermined amount. The two interferometer outputs are 180 degrees out of phase, and therefore amplifying the difference of the photocurrents of the photodiodes 160 and 162 using the differential amplifier 164 retains the sinusoidal signal from the interferometer, but rejects common mode noise such as laser intensity variations. Therefore the zero crossings of the output voltage signal from differential amplifier 164 occur at regularly spaced intervals in laser optical frequency.

The ADC 180 acquires a sample from the detector photodiode 142 whenever the output of differential amplifier 164 crosses zero volts in a positive direction. In this way, the ADC samples the voltage signal output of the detector photodiode 142 at times controlled by the output of the clock box 150.

The ADC 180 records voltages from the detector photodiode 142 in the manner described above for the duration of the laser wavelength sweep, and provides this data to the computer 182 for analysis.

The computer 182 calculates the Fourier transform of the voltage values acquired from the detector photodiode 142. The amplitude of the Fourier transform is analysed to find peaks. Each peak corresponds to one of the retro-reflective targets 138, and the frequency of the peak is proportional to the distance to the respective target 138.

When the sensor in the detector detects movement of the retroreflective targets 138 and reports this to the computer 182, the computer reapplies the Gerchberg-Saxton algorithm to adjust the pattern for display on the SLM 130, and sends the resulting pattern to the SLM 130 so that the beams emerging from the fourth lens 136 continue to illuminate and the system can continue to measure each of the retroreflective targets 138.

Modifications can be made to the above described embodiment. The tuneable laser may include an optical amplifier, for example an Erbium doped fibre amplifier, in order to increase the output power, which is beneficial when measuring targets at large distances.

The third lens 132 may be located between lenses 128 and the SLM 130. Those skilled in the art will realise that, when lenses 128 and lens 132 are located side by side in this manner, the function of all three lenses (providing a prescribed size and convergence angle of the beam incident upon the SLM) may be achieved using a different number of lenses, for example two lenses.

The embodiment described above makes distance measurements using a single frequency swept laser. Measurements may be made instead using a two laser arrangement such as that described in (Schneider, Thürmel, & Stockmann, 2001). This offers increased resistance to measurement errors caused by target motion during the laser frequency sweep.

The light director does not need to include a fibre directing element and a light divider. The light director can be any optical element that is able to direct light to the spatial light modulator. However, the light director preferably also directs retroreflected light to the detector.

The light divider does not need to be an optical fibre but can be any optical element configured to direct a first portion of input light to the spatial light modulator, and to direct a second portion of input light to the detector.

The end of fibre 126 may be given a partially reflective coating, for example a 33% reflective coating. This can increase the amplitude of the interference signals observed on photodiode 142.

Although many of the optical elements are described above as being lenses, other optical elements can be used as long as they provide the appropriate level of magnification and/or imaging. For example, curved mirrors can be substituted for lenses. Furthermore a combination of several lenses may be used in place of any single lens.

The embodiment described above uses a transmissive SLM. As is well known, a reflective SLM may be used to achieve the same effect. There are various well known optical arrangements in which such a component may be used. In one arrangement, light is directed onto the reflective SLM at a small angle. In another arrangement light is directed onto the reflective SLM through a polarising beamsplitter cube, with a birefringent element such as a half waveplate between the SLM and beamsplitter cube.

Algorithms other than the Gerchberg-Saxton algorithm may be used to design a pattern to display on the SLM.

In a further embodiment of a system according to the present invention, the retroreflective targets 138 are surrounded by a plurality of measurement devices 120, each measurement device 120 being configured as described above.

Each measurement device can be provided with its own light source 100, or light from a single light source can be divided amongst a plurality of measurement devices 120.

Each measurement device 120 can be provided with its own clock box 150 and ADC 180, or a single clock box 150 and ADC with multiple input channels can be used for a plurality of measurement devices 120. However, the data acquired by the ADC 180 for all measurement devices 120 is provided to the computer 182.

In this embodiment, the computer 182 acquires details of the distance of each of the retroreflective targets 138 from each of the measurement devices. If the relative arrangement of the measurement devices 120 is known, this data can be used by the computer to produce a three-dimensional coordinate for each of the retroreflective targets 138. This can be particularly advantageous in tracking the position in three dimensional space of large components which need to be assembled together, for example components of an aircraft fuselage.

One way in which the relative arrangement of the measurement devices 120 and retroreflective targets 138 can be obtained is to perform a least squares fitting process that adjusts estimates of the unknown parameters (the measurement device and retroreflective target positions) to find an estimate that is consistent with the measured distances. This is analogous to the well-known 'bundle adjustment' process in photogrammetry. The process requires that there are more measured distances than unknown parameters, of which there will be three (corresponding to x, y, and z positions in a Cartesian coordinate frame) for every measurement device 120 and retroreflective target 138. For example, this may be achieved with 4 measurement devices each observing the same 6 or more retroreflective targets.

Targets 138 may be provided on the measurement devices themselves. This provides further information to the least squares fitting process mentioned above, which may increase the accuracy of measured coordinates.

Targets 138 may be provided attached to stable locations such as a wall or floor. These may be used to define a fixed reference frame with which to compare object position or movements to.

Applications of embodiments of the invention include general co-ordinate metrology, similar to applications served by laser trackers and photogrammetry, error mapping CMMs, machine tools and motion stages, and monitoring structural deformations. These applications can be particularly useful, for example in the aeronautical industry for monitoring jigs, deformations, or when assembling the wing or the fuselage. They can also be useful in space technology for example for monitoring deformations of satellite components, for example when under thermal vacuum testing. They can be used in the automotive industry, or in renewable energy, for example for measuring deformations of wind turbine blades, or in scientific research for example for alignment of critical components in particle accelerators and large telescopes and other instruments where accuracy and precision are essential. Another potential application area is assembly of flat screen TV panels which require precise alignment of parts when being assembled under vacuum.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

REFERENCES

Gerchberg, R., & Saxton, W. (1971). Phase determination for image and diffraction plane pictures in the electron microscope. Optik. Retrieved from http://schoolargoogle-.co.uk/scholar?hl=en&q=gerchberg+saxton&btnG=&as_sdt=1%2C5&as_sdtp=#7

Takatsuji, T., Goto, M., Osawa, S., Yin, R., & Kurosawa, T. (1999). Whole-viewing-angle cat's-eye retroreflector as a target of laser trackers. Measurement Science and Technology, 10(7), N87-N90. doi:10.1088/0957-0233/10/7/403

Schneider, R., Thürmel, P., & Stockmann, M. (2001). Distance measurement of moving objects by frequency modulated laser radar. Optical Engineering, 40(1), 33. doi:10.1117/1.1332772

The invention claimed is:

1. A measurement system, including:
   a measurement device, the measurement device including:
   a light director and a spatial light modulator, wherein the light director is disposed to direct light to the spatial light modulator and the spatial light modulator is disposed to receive light from the light director and to modulate it to form an intensity pattern;
   an optical element disposed to receive light which formed the intensity pattern and arranged to magnify the intensity pattern into a measurement space; and
   a detector disposed to detect light reflected from the measurement space;
   the system including at least one retroreflective target for reflecting light to the detector, the system being configured to measure a coordinate of the at least one retroreflective target.

2. A measurement system according to claim 1, wherein the optical element is arranged to image the intensity pattern at an infinite distance from the optical element; or
   the optical element is arranged to magnify the intensity pattern into the measurement space in a divergent manner; or
   the optical element has a numerical aperture higher than 0.2, preferably higher than 0.4 and most preferably higher than 0.6; or
   the spatial light modulator is programmable whereby the intensity pattern is controllable; or
   the measurement system is configured to measure distance using frequency scanning interferometry.

3. A measurement system according to claim 1, further including a second optical element arranged to form the intensity pattern from light received from the spatial light modulator.

4. A measurement system according to claim 1, further including a control unit for controlling the spatial light modulator, the control unit being configured to control the spatial light modulator to form the intensity pattern, when illuminated with light from the light director, to produce at least one light beam in the measurement space;
   wherein the control unit is preferably configured to control the spatial light modulator to form the intensity pattern, when illuminated with light from the light director, to produce a plurality of light beams in the measurement space.

5. A measurement system according to claim 4, wherein the control unit is operable to direct each beam at a retroreflective target in the measurement space;
   wherein the control unit is preferably operable to control the spatial light modulator to compensate for movement of one or more retroreflective targets within the measurement space.

6. A measurement system according to claim 1, wherein the light director is configured to direct retroreflected light from the measurement space to the detector.

7. A measurement system according to claim 6, wherein the light director includes a light divider disposed to direct a first portion of input light to the spatial light modulator, and a second portion of input light to the detector as reference light for performing interferometry with light reflected from the measurement space.

8. A measurement system according to claim 7, wherein the light director includes an optical fibre, wherein the light divider is provided by an end of the optical fibre; the light director further including a light directing element configured to direct light reflected from the end of the optical fibre or from the measurement space to the detector.

9. A measurement system according to claim 1, further including a light source for providing input light to the light director;
   wherein the light source is preferably a laser.

10. A measurement system according to claim 1, including a plurality of said measurement devices;
    wherein the plurality of said measurement devices are preferably arranged around an object to be measured.

11. A measurement system according to claim 1, wherein the at least one retroreflective target is a plurality of retroreflective targets;
    wherein the retroreflective targets are preferably arranged on one or more objects to be measured.

12. A method of measuring targets, including:
    arranging a plurality of retroreflective targets in a measurement space;
    directing light at a spatial light modulator;
    operating the spatial light modulator to modulate the light to produce a plurality of light beams in the measurement space, there being at least one beam directed at each of the retroreflective targets; and
    detecting at a detector light reflected from each of the retroreflective targets and thereby determining a measurement associated with each retroreflective target.

13. A method according to claim 12, including moving the retroreflective targets within the measurement space and operating the spatial light modulator to adjust an intensity pattern to continue to illuminate each of the retroreflective targets with at least one of the said beams;
    wherein in response to movement of the retroreflective targets, a control unit preferably operates the spatial light modulator to compensate for the movement to continue to illuminate each of the retroreflective targets with at least one of the said beams.

14. A method according to claim 12, wherein operating the spatial light modulator to modulate the light to produce a plurality of beams in the measurement space includes operating the spatial light modulator to produce an intensity pattern and magnifying the intensity pattern into the measurement space to produce the plurality of beams in the measurement space;
    wherein magnifying the intensity pattern preferably includes magnifying the intensity pattern in a divergent manner so that each of the beams is a divergent beam in the measurement space.

15. A method according to claim 14, wherein the intensity pattern is imaged at an infinite distance from the spatial light modulator.

16. A method according to claim 12, wherein the spatial light modulator is programmable whereby the intensity pattern is controllable.

17. A method according to claim 12, wherein detecting at a detector light reflected from each of the retroreflective targets includes directing light retroreflected from the measurement space to the detector.

18. A method according to claim 12, wherein detecting at a detector light reflected from each of the retroreflective targets and thereby determining a measurement associated with each retroreflective target includes directing reference light at the detector and performing interferometry with the reference light and light reflected from the measurement space to determine a measurement of distance associated with each retroreflective element.

19. A method according to claim 18, wherein directing light at a spatial light modulator includes directing a first portion of input light at the spatial light modulator, and directing a second portion of input light at the detector to provide the reference light.

20. A method according to claim 12, including placing a plurality of said spatial light modulators in the measurement space, directing light at each of the spatial light modulators, and operating each of the spatial light modulators to modulate the light to produce a plurality of beams in the measurement space, there being at least one beam associated with each spatial light modulator directed at each of the retroreflective targets;

wherein detecting at a detector includes detecting at a detector light reflected from each of the retroreflective targets and thereby determining a multi-dimensional coordinate of each of the retroreflective targets.

\* \* \* \* \*